US008200555B2

(12) United States Patent
Auvenshine et al.

(10) Patent No.: US 8,200,555 B2
(45) Date of Patent: Jun. 12, 2012

(54) METHOD TO MONITOR AMOUNT OF USAGE OF APPLICATIONS IN A SERVER AND THEIR BILLING

(75) Inventors: John J. Auvenshine, Tucson, AZ (US); Justin C. Blackburn, Surprise, AZ (US); Nicolas E. Fosdick, Frederick, CO (US); Christopher J. Jacoby, Chandler, AZ (US)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/449,341

(22) Filed: Jun. 8, 2006

(65) Prior Publication Data
US 2008/0005020 A1 Jan. 3, 2008

(51) Int. Cl.
*G07F 19/00* (2006.01)
*H04M 15/00* (2006.01)
(52) U.S. Cl. ........................................ 705/34
(58) Field of Classification Search .............. 705/1, 2, 705/3, 4, 28, 40, 44, 45; 348/14.01
See application file for complete search history.

(56) References Cited

U.S. PATENT DOCUMENTS

| 6,035,281 A * | 3/2000 | Crosskey et al. ............ 705/14 |
| 6,671,699 B1 * | 12/2003 | Black et al. ................ 707/201 |
| 6,816,882 B1 * | 11/2004 | Conner et al. .............. 709/203 |
| 6,850,889 B1 * | 2/2005 | Zayas, Jr. ................... 705/3 |
| 7,149,784 B2 * | 12/2006 | Kitada et al. ............... 709/207 |
| 2002/0010630 A1 | 1/2002 | Kitamura ..................... 705/14 |
| 2002/0019774 A1 | 2/2002 | Kanter ........................ 705/14 |
| 2002/0095606 A1 | 7/2002 | Carlton ....................... 713/201 |
| 2003/0074313 A1 | 4/2003 | McConnell et al. .......... 705/40 |
| 2003/0144858 A1 * | 7/2003 | Jain et al. .................... 705/1 |
| 2004/0068447 A1 | 4/2004 | Mao et al. .................... 705/27 |
| 2005/0246272 A1 * | 11/2005 | Kitada et al. ................ 705/40 |

FOREIGN PATENT DOCUMENTS

| JP | 2001338231 A | 7/2001 |
| JP | 2003005857 A | 8/2003 |

* cited by examiner

*Primary Examiner* — Paul Danneman
(74) *Attorney, Agent, or Firm* — Yee & Associates, P.C.; Arthur J. Samodovitz

(57) ABSTRACT

Computer implemented method for determining an amount to bill a first owner of a first application executing in a computer, and a second owner of a second application executing in the computer. The computer receives a request from a remote client to transfer a file to the client. The file is shared by the first and second applications. The client made a prior request to the first application before making the request for the file. A determination is made that the request from the client to transfer the file should be billed to the first owner based on the client's prior request to the first application. The client made the prior request to the first application closer in time, than another prior request from the client to the second application, to the request to transfer the file.

12 Claims, 5 Drawing Sheets

METHOD TO MONITOR AMOUNT OF USAGE OF APPLICATIONS IN A SERVER AND THEIR BILLING

FIELD OF INVENTION

The present invention relates generally to computer systems, and more particularly to a technique to monitor an amount of usage of applications in a server, for billing or other purposes.

BACKGROUND OF THE INVENTION

It is well known to use a server computer to execute one or more applications to handle requests by remote users. The applications may interface to the user via web pages which are displayed on the users' workstation by a web browser. The applications may also provide other types of information, such as files, to the user.

Typically, a user makes requests to an application (or "web") server for an application by specifying a Universal Resource Locator (URL) corresponding to the web server and the specific application on the web server. The portion of the URL which follows the server specification is the Universal Resource Identifier (URI). In some cases, the URI may correspond to a file which is used by more than one application, and the URI does not correspond to a single application. A logging function in the web server (for example, IBM Web Sphere for dynamic parts and IBM HTTP server function for the static parts) keeps a log of the source IP of the requester, the URI in the request and the time the request was received. If the request is for a static web page or graphic, an HTTP server function in the web server forwards the requested data to the user. Typically, a web page has a static template, and various fields or frames in the template which are generated dynamically. In some cases, a "servelet", which is part of the application, generates the fields or frames of the template dynamically. After the web page elements are fetched (in the case of static elements) or generated (in the case of a dynamically generated elements), the application invokes a communication service in the web server to return the web page or file to the user. The logging function in the web server (for example, IBM Web Sphere for dynamic parts and IBM HTTP server function for the static parts) also records the number of bytes of the web page or file that were uploaded/returned to the user in response to the request.

It was known to execute multiple applications in a single server, where there is a separate "owner" of each application. The owners can be different companies or different billing entities within the same company. It was known to bill the owner of each application based on the amount of computer and/or network resources consumed by the application during the billing period.

For example, it was known to bill the owner of each application based on the amount of processor time that each application consumed by its execution. This was done by running a separate instance of the web server process for each application, and recording the processor time utilized by each application's web server process. However, this method significantly reduces the number of applications which can simultaneously share a server computer because each process generates significant overhead for the system.

It was also known to bill the owner of each application based on the amount of data that each application caused to be uploaded to clients. This can be implemented by running a separate instance of the web server process for each application, which as stated above adds significant overhead. Also, it was known to bill the owner of each application based on the amount of data each application caused to be uploaded to clients by separating each application into a separate server IP address or domain name (even if all of these different addresses all point to the same physical server). This solution can be used by organizations who want to bill separate divisions or business units yet provide a common server name for all applications to their users on the Internet.

A known Distributed File Service ("DFS") program by The Open Group checked metadata of files to determine the application which owns the files, and then billed the application owner for the storage of the files.

It was also known to bill the owner of each application based on the resources used by a virtual machine or logical partition (LPAR). Some types of computer systems are logically partitioned by a central operating system into separate, "logical" computers. A logical partition ("LPAR") can be established in a virtual machine or non virtual machine environment. Each logical partition comprises a share of the computer resources, and executes a guest operating system and application(s) using that share of the computer resources. For example, each LPAR may be given a periodic, time slice of the system's processor(s) to execute the operating system and application(s) within the logical partition. So, if a computer system is logically partitioned into ten logical computers, and each partition has an equal share of computer resources, then each logical partition can be executed on the processor(s) ten milliseconds every hundred milliseconds. In this manner, the applications within each logical partition execute as if they have their own dedicated computer resources (although the applications may be dormant ninety percent of the time). Alternately, if there are multiple processors in the system, each logical partition can have some of the processors dedicated to it.

The "share" of system resources for each logical partition is generally specified by a systems administrator during or before Initial Micro code Load ("IML") (but, in some cases, can be changed dynamically without IML), and this is based on an estimate of the relative needs of all the logical partitions for the finite computer resources. However, the specified share of computer resources for a logical partition may be greater (or lesser) at times than actually needed. For example, assuming the application(s) in the logical partition handle user requests, the frequency of the user requests may vary from time to time. During times of fewer requests, the applications in the logical partition may not need the entire share of hardware resources allocated to it. So, the logical partition may begin to execute during its allocated time slice, but complete its outstanding requests before the end of the time slice. In such a case, the operating system in the logical partition will notify the central operating system to suspend its execution for the remainder of the time slice. Then, the next logical partition in the sequence will immediately begin its time slice (earlier than scheduled), as will the subsequent logical partitions in the sequence. If the other logical partitions use their entire allocated time slice, then the actual share of processor time used by the one logical partition with the fewer user requests will be less than the specified share. In the case where the logical partition has more requests than can be handled in the specified share of processor time, there is not ordinarily any automatic upgrade to the allocated share of computer resources. Instead, the users and/or systems administrator may notice a slow operation for the applications in the logical partition, and the systems administrator can then adjust the specified share for the logical partition, reconfigure the logical partitions or take other action.

There are different reasons for logical partitioning. One reason is to isolate the applications in one logical partition from the applications in the other logical partitions. For example, different users can have their applications run in different logical partitions for improved reliability, security, availability, maintainability, etc. Another reason is for billing purposes. Today customers purchase computer systems with greater capacity than is required. This is done in anticipation of future peak computing demands. Customers initially register and enable some but not all of their system's Central Processors (CPs). They are then billed based on the number of CPs that are enabled, i.e. the enabled computing capacity. When customers need additional computing power (at least on a peak basis), they may register and pay for more CPs.

It was known for the computer hardware and system operating system to track and record in a system log which LPAR is currently executing and on which processor(s). The LPAR usage information was subsequently used to compute the amount of processor usage by each logical partition per hour, and therefore, whether each LPAR has the proper processor capacity. The LPAR usage information and computation of processor usage were also sent to a systems administrator.

It was also known for a guest operating system in each LPAR to track when each application begins execution and ceases execution, as "binary application indicator" information. (It was also known for another guest operating system to measure the time that each application is dispatched.) The "binary application indicator" information indicates whether the respective application ran at any time during the previous sampling period. The guest operating system recorded this binary application indicator information in storage private to the LPAR. It was also known for the guest operating system in each LPAR to track overall resource consumption in a sampling period, i.e. the amount of service unites consumed by all program functions (i.e. guest operating system, applications, etc.) in the LPAR during the sampling period. The guest operating system recorded this resource consumption information in storage private to the LPAR. A prior art software-based reporting system cross-referenced/compiled the application indicator information for the respective LPAR and the corresponding LPAR resource consumption information. This cross referencing/compiling produces a report which indicates how many service units were used by all the LPARs that executed each application during the previous sampling period. If two applications ran in an LPAR, then each application was charged for the overall resource consumption of the entire LPAR. This report was then used to determine an amount to charge the customer for the usage of each application. Customers then manually submit the cross referencing reports to the owner of the applications. These reports are input to an auditing and pricing application in a remote work station of the owner. While the foregoing process for a software-based reporting system was effective, it required that (a) the guest operating system in each LPAR track when each application begins and ceases execution, (b) the guest operating system in each LPAR track overall resource consumption of the LPAR and (c) the software-based reporting system cross reference data from each LPAR. This was burdensome to the systems administrator because there can be many LPARs in each system. Also, some reports are susceptible to customer tampering.

Published Patent Application US 2005-0004879 A1 entitled "System and Method To Monitor Amount of Usage of Applications In Logical Partitions", published Jan. 6, 2005, by Mathias discloses a system, method and program product for determining an amount of usage of applications in an LPAR in a computer system and a bill for such usage. A guest operating system executes in the LPAR. The guest operating system dispatches a plurality of applications in the LPAR. The guest operating system or other program executing in the LPAR determines information indicative of an amount of usage of each of the applications. Based on the information, an amount of usage of each of the applications is reported to a billing function. The billing function determines a bill for each of the applications based on the amount of usage of each of the applications. An amount of usage of the LPAR is determined based on system data, without using application usage information determined by the guest operating system or the other program in the LPAR. The total usage of all of the applications in the LPAR is determined based on the information determined by the guest operating system or the other program in the LPAR. The total usage of all of the applications is compared to an amount of usage of the LPAR based on the system data, to audit the amount of usage of the applications in the LPAR or a charge based on the amount of usage of the applications.

An object of the present invention is to provide a convenient and effective technique to monitor and report usage of individual applications within the same computer, virtual machine, or LPAR, for billing or other purposes.

Another object of the present invention is to provide a convenient and effective technique to monitor and report usage of individual applications sharing a single IP name or address and a single web server process within the same computer, virtual machine, or LPAR, for billing or other purposes.

SUMMARY OF THE PRESENT INVENTION

The invention resides in a computer implemented method for determining an amount to bill a first owner of a first application executing in a computer, and a second owner of a second application executing in the computer. The computer receives a request from a remote client to transfer a file to the client. The file is shared by the first and second applications. The client made a prior request to the first application before making the request for the file. A determination is made that the request from the client to transfer the file should be billed to the first owner based on the client's prior request to the first application.

In accordance with a feature of the present invention, the client made the prior request to the first application closer in time, than another prior request from the client to the second application, to the request to transfer the file.

In accordance with other features of the present invention, a length of the file transferred to the client is determined, and the first owner is billed based on the length of the file transferred to the client.

DETAILED DESCRIPTION OF THE PREFERRED EMBODIMENTS

Figure 1:
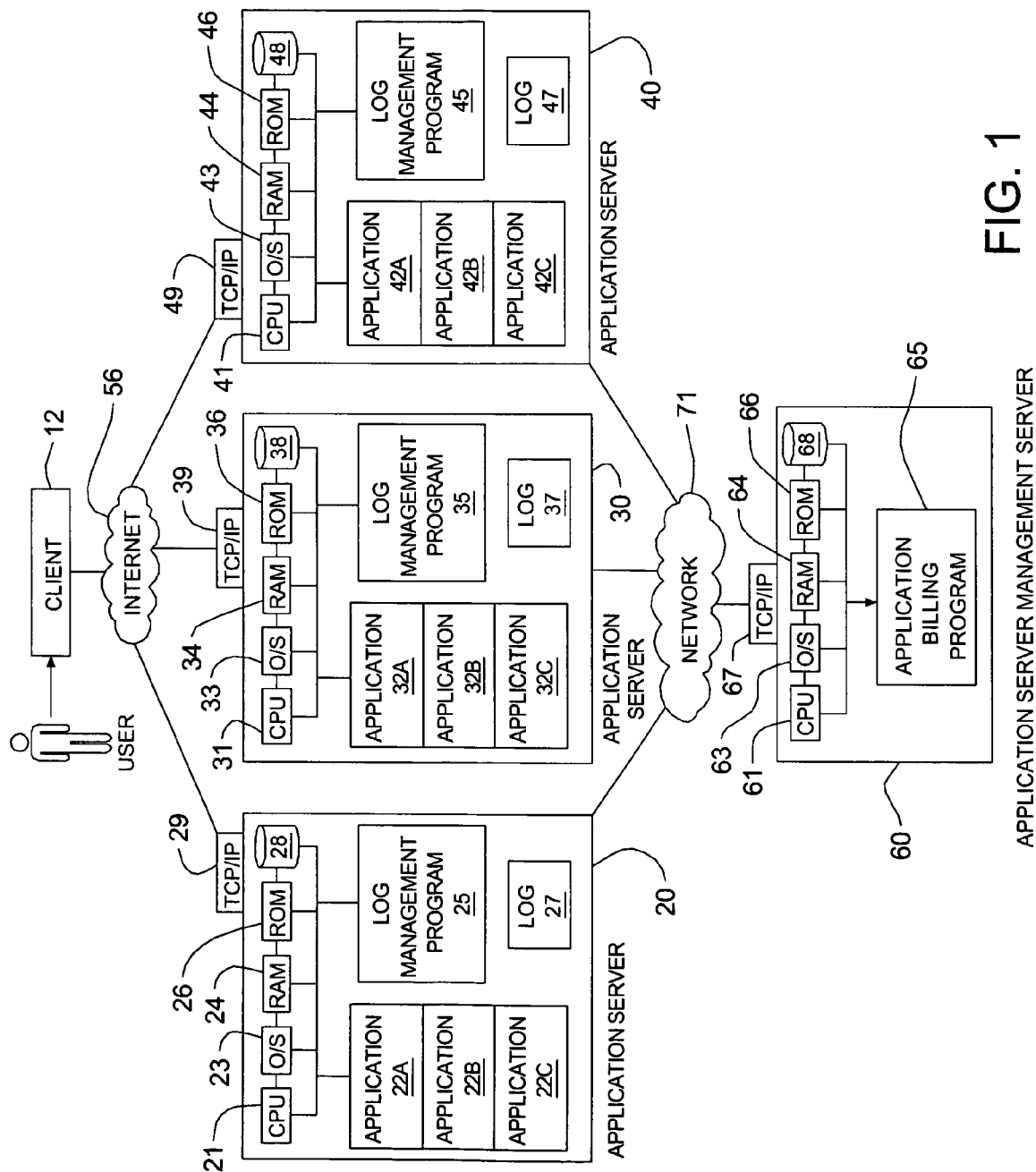
FIG. 1 is a block diagram of a distributed computer system, including web servers and a web server management server, in which the present invention is incorporated.

The present invention will now be described in detail with reference to the figures. FIG. 1 illustrates a distributed computer system generally designated 10 which includes the present invention. System 10 includes application (or "web") servers 20, 30 and 40, which by way of example, are an Apache server, IBM Websphere server and a database server with a web interface, respectively. However, the present invention is applicable to servers running most any type of applications. Server 20 includes known CPU 21, one or more applications 22a,b,c, operating system 23, RAM 24, ROM 26, disk storage 28, and TCP/IP adapter card 29. Server 30 includes known CPU 31, one or more applications 32a,b,c, operating system 33, RAM 34, ROM 36, disk storage 38 and TCP/IP adapter card 39. Server 40 includes known CPU 41, one or more applications 42a,b,c, operating system 43, RAM 44, ROM 46, disk storage 48 and TCP/IP adapter card 49.

Servers 20, 30 and 40 also include known log management programs 25, 35 and 45, respectively, according to the present invention. As explained in more detail below, programs 25, 35 and 45 record data that is used by application billing program 65 in application server management server 60 to determine usage by one or more applications 22a,b,c, 32a,b,c and 42a,b,c of computer resources (for example, CPU 20, 30, RAM 24, 34, 44, respectively and network resources) within servers 20, 30 and 40, respectively. The data includes the source IP address of each requester, the URI of the request, including the name of a file, if any, fetched and uploaded or a program, if any, to be executed, the time and date that the request was made, and the number of bytes of web pages and/or files uploaded for each client request. The application billing program 65 then analyses this data, according to the present invention, for purposes of usage-based billing of the owners of applications 22a,b,c, 32a,b,c and 42a,b,c. Servers 20, 30 and 40 are coupled via a network 56 such as the Internet to application server management server 60 such as an IBM Tivoli management server. As explained in more detail below, each of the servers 20, 30 and 40 periodically sends data to server 60 indicating amounts of computer resources used by applications 22a,b,c, 32a,b,c and 42a,b,c, respectively. Server 60 stores this data in storage 62 for subsequent analysis according to the present invention. In one embodiment of the present invention, program 65 can store the usage data in an IBM Tivoli Data Warehouse, and use a configuration management database to correlate URIs with applications and owners.

Server 60 includes a known CPU 61, operating system 63, RAM 64, ROM 66, storage 68 and TCP/IP adapter card 67, and is connected to servers 20, 30 and 40 via a network 71 such as the Internet.

Server 60 also includes the application billing program 65, according to the present invention, which determines a usage-based bill for the owners of applications 22a,b,c, 32a,b,c and 42ab,c, respectively, based on the data provided by the log management programs 25, 35 and 45.

Each of the servers 20, 30 and 40 may or may not be divided into logical partitions or may themselves be logical partitions or virtual machines contained within a larger physical server. If the servers 20, 20 and 40 are divided into LPARS, then each of the applications in each server can execute in the same or different LPAR. As known in the prior art, each logical partition is allocated a share of computer resources, i.e. processor, RAM and storage, and has its own guest operating system. Other computer resources are allocated for "system" operation, including a base operating system which allocates the resources for the LPARs, and controls their IML, IPL and activation.

Figure 2:
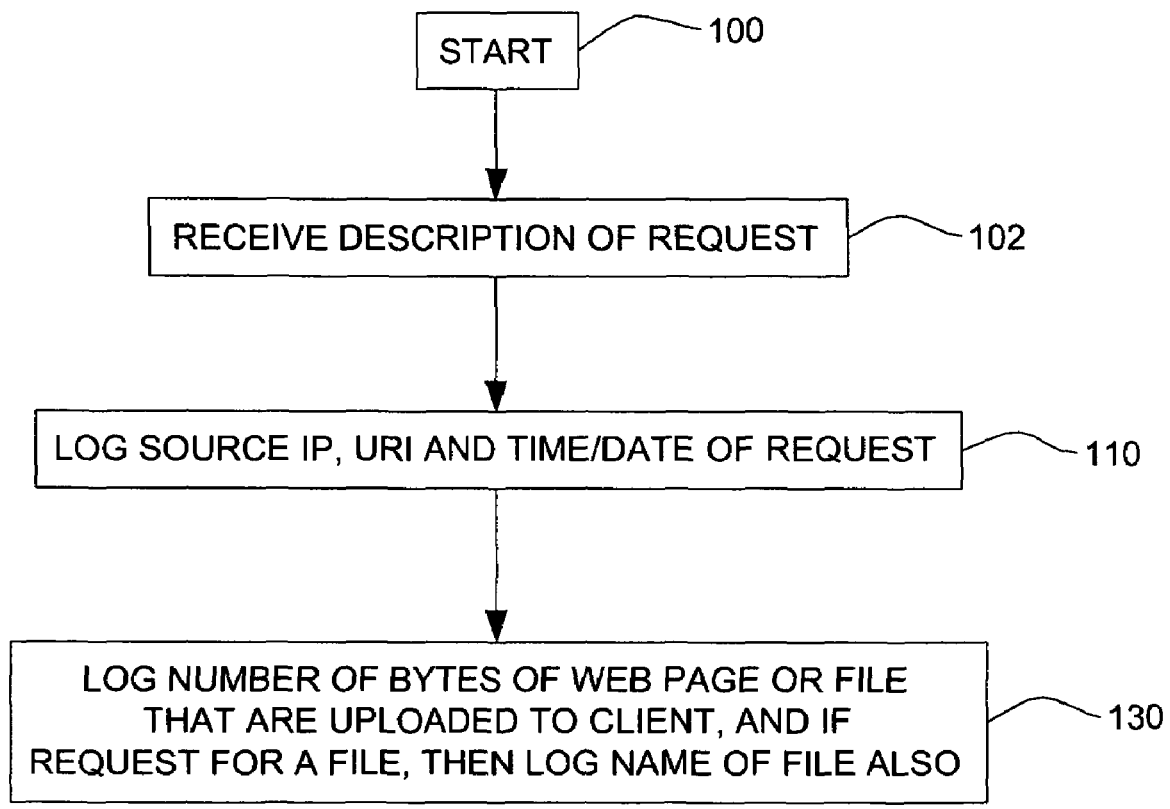
FIG. 2 is a flow chart of a log management program within each of the web servers of FIG. 1.

FIG. 2 illustrates in more detail the function and operation of log management programs 25, 35 and 45. In a typical scenario, a client workstation requests a web page by specifying a Universal Resource Locator ("URL"). The URL specifies a target server, such as application server 20, 30 or 40, followed by a Universal Resource Identifier (URI). The URI specifies the path to the file to be retrieved, or the program to be executed to build a dynamic page along with any necessary program parameters. The request proceeds to the Internet 56 where routers, network switches, firewalls, etc. route the request to the target application server corresponding to the URL. In other cases, the request proceeds through a private network via routers, network switches, and firewalls to the target application server corresponding to the URL. The URI may specify a program owned by (for example, controlled, managed, and billed to) a specific target application (such as application 22a,b or c within server 20, application 32a,b or c within server 30 or application 42a,b or c within server 40) within the target server to provide the requested web page, typically as an interface to the target application. By way of example, the target application can be an e-commerce application to sell products via the Internet, an application to provide information about a company or service, or an online content service such as news, music, or video. Alternatively, the URI may specify a program shared by multiple applications, sometimes known by names such as "web service", "common utility", or "library utility". Alternately, the URI may specify a static file to be served by the target server, which the client wants to receive via the Internet, in whole or in part. The file may be owned (for example, its content controlled, managed or accessible) by a single application or shared (i.e. its content controlled, managed or accessible) by multiple applications. After receiving the request, the web server program invokes the log management program in the same application server (step 100), and supplies the details of the request, i.e. time stamp, source IP address of the requester, and URI of the request (step 102). The source IP corresponds to the network address of the client computer which is used by the user to make the request, or which is executing a client program which made the request itself. Typically, the URIs for applications within a server are hierarchically structured, with each application controlling parts of the URI name space. In response, log management program 25, 35 or 45 (for example, IBM Web Sphere for dynamic parts and IBM HTTP server function for the static parts) in the application servers 20, 30 or 40, respectively, logs (in logs 27, 37 and 47, respectively) the source IP of the requester, the URI of the request and the time and date the request was received (step 110). Alternatively, the log management program 25, 35, or 45 may be a module or subroutine built into the web server program.

If the URI in the request identifies a specific target application (for example, if the application has a unique URI, based on a directory tree in the hierarchical URI, in which the requested program or file resides), the web server process services the request for the target application only. If the URI corresponds to a static web page, program file that executes on the user's computer ("applet" or "client-side script"), or graphic owned by a specific application, the target web server process identifies and fetches the appropriate file. If the URI corresponds to a web page that has a static template and various fields or frames in the template which are generated dynamically, a program that executes on the web server ("servelet" or "server-side script"), which is part of the application, generates the web page dynamically by inserting the proper data for the dynamic fields and frames into the static template. In either case, the web server uploads the static or dynamic web page to the user. The term "file" as used herein includes a data file (such as an FTP or other file type), media file (such as audio and/or video streaming or upload), statically generated web page (such as an HTML and graphics), dynamically generated web pages (such as web pages that are dynamically generated in whole or in part at the server), statically and dynamically generated web pages, program files, applets, script lists, CGI scripts, java scripts and java server pages, flash animations, results of database queries (such as JDBC and ODBC), and combinations of the foregoing. The log management program 25, 35 or 45 in the web server also records, in association with the URI of the request, the number of bytes of data that were uploaded/returned to the user in response to the request (step 130). Subsequently, application billing function 65 will bill the owner of the application based on the length of the web page, i.e. the total number of the bytes of data which were uploaded to the client to define the web page.

If the request identifies a target file other than a web page, then the web server forwards the request to a file manager program 27, 37 or 47 to fetch the target file. The file may be dedicated to or "owned" by a single application. For example, the URI does not identify the application directly, but the URI identifies a file that is dedicated to a single application, and there is metadata in the file which identifies the application that owns the file. As explained in more detail below, the application billing program 65 will read the metadata for files which are uploaded to determine the application which owns the file, and therefore who to bill for the upload. After fetching the target file, the file manager program invokes the communication service in the web server to upload the file to the user. The log management program 25, 35 or 45 in the web server also records the name of the file and the number of bytes of the file that were uploaded to the client in response to the request (step 130).

Alternately, the URI in the request identifies a target file other than a web page, and the file is shared by two or more applications. In such a case, the web server still forwards the request to the file manager program to fetch the target file. But, the metadata in the file does not identify one application as the owner to bill; instead it may identify two or more applications with shared ownership, or may not identify any owner at all. After fetching the target file, the file manager program invokes the communication service in the web server to return the file to the client. The log management program 25, 35 or 45 in the web server also records the name of the file which was uploaded and the number of bytes of the file that were uploaded to the client in response to the request (step 130). Subsequently, application billing program 65 will determine which application to bill for this upload of the shared file, as follows.

For example, one of the clients, such as client 12 or a user at client 12, requested upload of a shared file from web server 20. Client 12 is identified by its source IP address, and the log management program recorded all of the requests to the web server 20, as noted above. Subsequently, application billing program 65 obtained the log records from server 20, and determined from the log records of server 20 which application in server 20 that client 12 most recently made a request before client 12 made the request for the shared file. This client request (before the request for the shared file) could be another request to one of the applications 22a,b or c for a web page or a request to log on to one of these applications 22a,b or c. Program 65 then assumes that this application 22a,b or c (for which client 12 most recently made a request before client 12 made the request for the shared file) was associated with the request for the shared file. For example, if client 12 made a request to log on to application 22a shortly before client 12 made the request to upload the shared file, then it is likely that application 22a was associated with the request by client 12 for the shared file. For example, after logging on to the application 22a and getting the home page for application 22a, client 12 may have selected a link on the home page of application 22a to upload the shared file. As another example, after requesting a web page from application 22a, client 12 may have selected a link on the web page from application 22a to upload the shared file. Program 65 will then bill the owner of application 22a for the upload of the shared file, based on the number of bytes of the shared file that were uploaded.

As noted above, the billing for each application is based on the number of bytes of the web pages or files that were uploaded to the client on behalf of the application. Therefore, the billing correlates to usage by each application of the resources in the target web server, and also the network used by the target server to upload the web pages or files for each application. Typically, the greater the amount of data to be transferred across the network, the greater the utilization by each application of resources in the target web server and network and the greater the cost to the owner of the web server and network. This should translate to a greater bill for the owners of the applications that furnished the web pages or files, directly or indirectly. The resources in the target web server that are used to fetch, sometimes create, and upload the web page or file are CPU, memory, storage and I/O device to the network. The resources in the network that are used for the upload are communication media, edge routers, firewalls, switches, telecommunications networks, and caching devices or proxy servers.

Figure 3A:
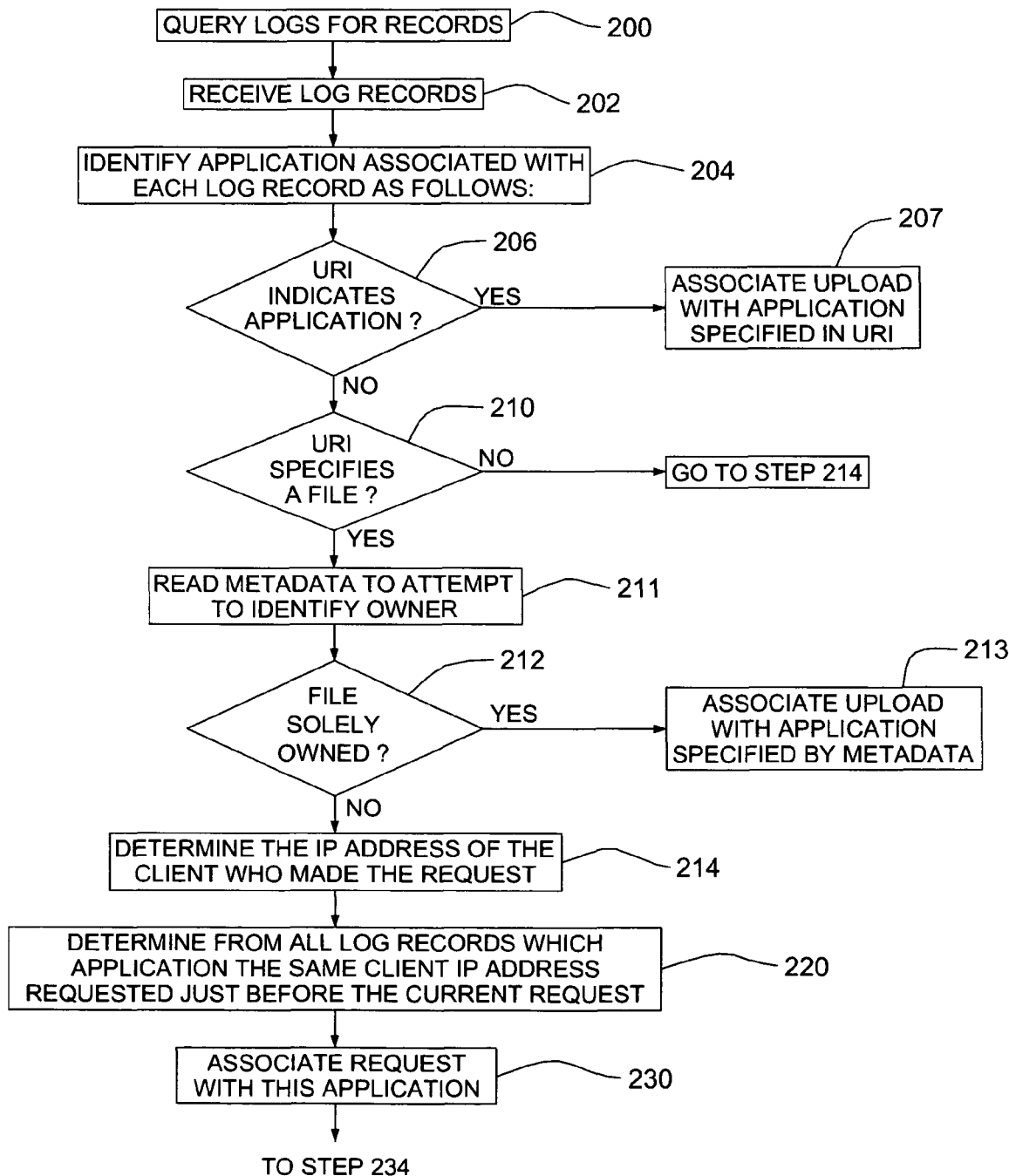
FIGS. 3(A), 3(B) and 3(C) form a flow chart of an application billing program within the web server management server of FIG. 1.
Figure 3B:
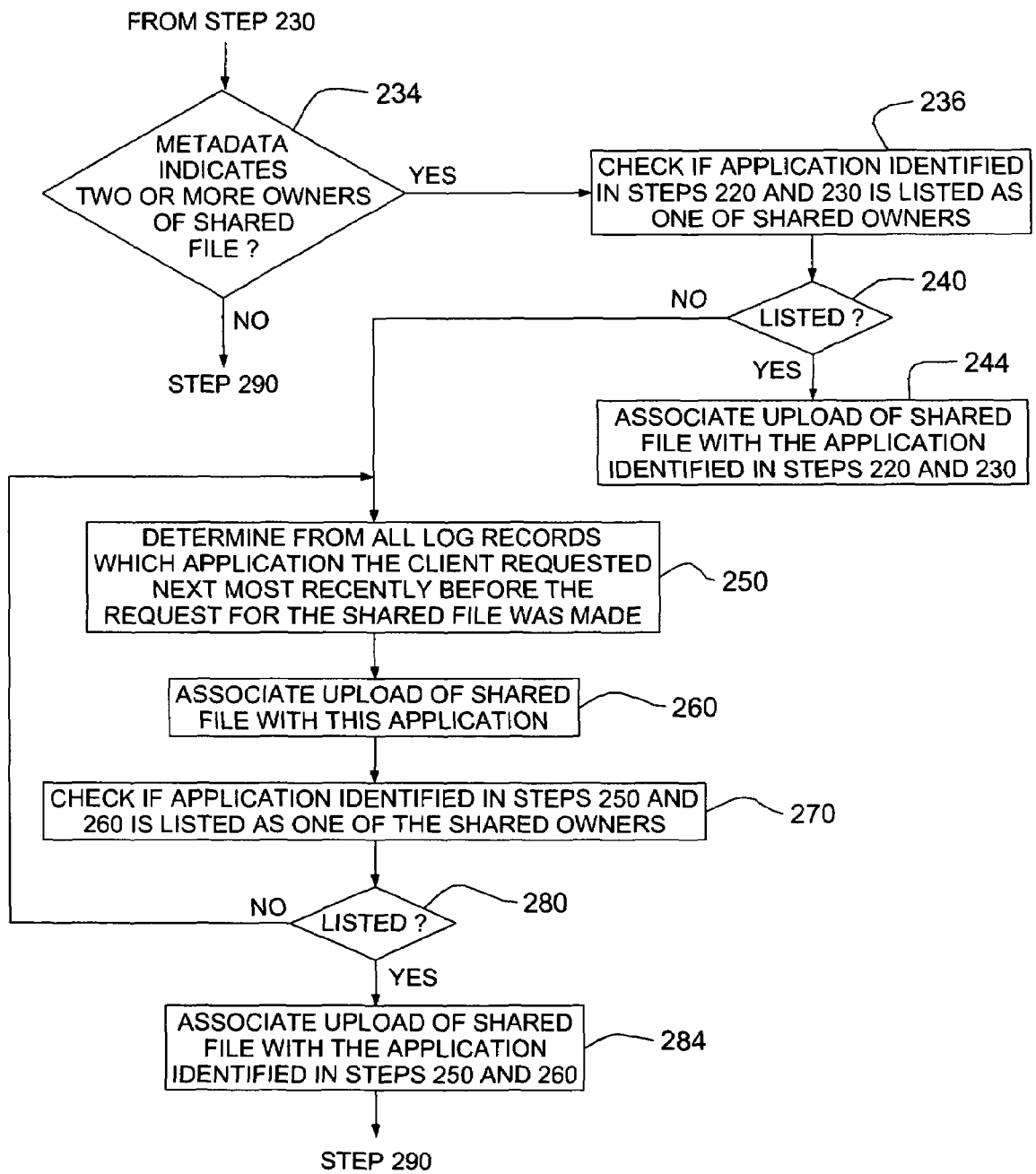
Figure 3C:
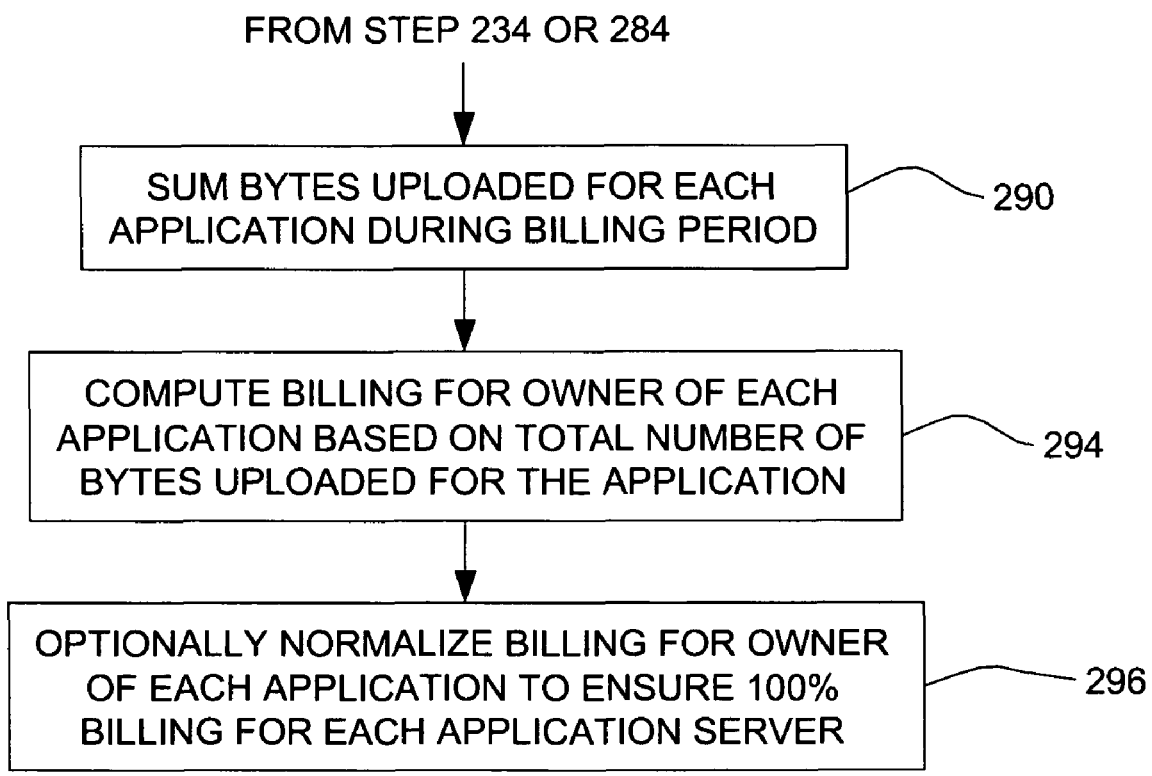

FIGS. 3(A), 3(B) and 3(C) illustrate the function of application billing program 65 in more detail. In step 200, program 65 queries each of the web servers 20, 30 and 40 for their log records. After receipt of the log records (step 202), program 65 processes the log records separately for each web server, as follows. In step 204, for each log record, program 65 identifies the associated application and the length of web page or file that was uploaded. This content can be static web pages (such as traditional HTML and graphics), dynamic content (such as applets, scriptlets, javascript, flash animation or dynamic web pages), and mixtures of both static and dynamic content. Some of the log records indicate that the web page upload was associated with a specific application that owns the web page or file (decision 206, yes branch). For example, the URL directly specified the application, as the end part of the URL (the URI) directly corresponds to a sub-tree entirely owned by a single application. (The beginning part of the URL specified the application server which executed the application.) For these URIs that directly specify an application, that will be the application associated with the web page upload (step 207). Next, program 65 determines if the URI directly specifies a file (typically, as the end part of the URI) (decision 210). If not (decision 210, no branch), then program 65 jumps to step 214 described below. If the URI directly specifies a file (decision 210, yes branch), then program 65 reads metadata, if any, to attempt to identify an application which owns the file (step 211). Next, program 65 determines if the metadata indicates that the file is owned by a single application (decision 212). If so (decision 212, yes branch), program 65 will read that metadata, and associate the upload of this file to the sole owner (step 213). Other URI's specify a file which is shared by two or more applications (decision 212, no branch), or a static or dynamic page which does not reside in a portion of the URI name space (tree) solely owned by a single application. In such a cases, program 65 determines from the log record the source IP address of the client which made the request (step 214). Next, program 65 determines from the other log records of the same target application server which application in the target server the same client that requested the shared file most recently interacted with (before making the same client requested the shared file) (step 220). This application is assumed to be associated with the same client's subsequent request for the shared file (step 230). It some cases, the application which requested the shared file has not made a prior request to the application server within a predefined period. In which case, the request and upload for the shared file is not billed to any application directly, but instead is considered part of the overhead.

However, if there is metadata in the file which indicates that two or more applications share the shared file (decision 234, yes branch), then program 65 performs another check of the determination of steps 220 and 230 as to which application was associated with the request for the shared file. Program 65 will check if the application which was most recently requested by the same client that requested the shared file is listed as one of these shared owners (step 236). If so (decision 240, yes branch), that application is assumed to be associated with the request in the log record to upload the shared file (step 244). If not (decision 240, no branch), then program 65 identifies from the log records which application the client second most recently accessed in the target application server (step 250). Program 65 assumes this application to be associated with the subsequent request for the shared file (step 260). Next, program 65 checks if the application which was second most recently requested by the client is listed as one of these shared owners (step 270). If so (decision 280, yes branch), that application is assumed to be associated with the request in the log record to upload the shared file (step 284). The foregoing steps 250-284 are repeated (decision 280, no branch) until the application most recently accessed by the client is found to be listed as one of the shared owners of the file that was uploaded. The owner of this application is then billed for the upload of the shared file, based on the number of bytes of the shared file that were uploaded.

Next, for each of the applications in the application server, program 65 sums all of the bytes of all of the web pages and files associated with the application and uploaded to all clients (step 290). Next, program 65 applies a billing formula, such as the following, to bill the owner of each application (step 294):

Bill for Owner of Application X=K×Total Number of Bytes transferred for Application X, where K is a constant that approximates the charge to fetch and upload to a client each byte of a web page or file associated with application X.

Optionally, to ensure that each server is billed 100% to the owners of all applications in the server, the bills can be normalized as follows (step 296). The Total Number of Bytes transferred for each application is compared to the total number of bytes transferred for all applications in the application server. This forms a fraction which corresponds to the portion of the total cost of the application server for which the owner of each application should be billed.

Application billing program 65 can be loaded into server 60 from a computer readable media such as a magnetic disk or tape, optical disk, DVD, semiconductor memory, memory stick, etc. or transferred from the Internet via TCP/IP adapter card 67.

Log management programs 25, 35 and 45 can be loaded into servers 20, 30 and 40, respectively, from a computer readable media such as a magnetic disk or tape, optical disk, DVD, semiconductor memory, memory stick, etc. or transferred from the Internet via TCP/IP adapter cards 29, 39 and 49, respectively.

Based on the foregoing, a system, method and program for monitoring the amount of usage of applications in a server and determining their billing has been disclosed. However, numerous modifications and substitutions can be made without deviating from the scope of the present invention. For example, the individual servers could be replaced with multi-server clusters, with the logs from all the servers in a cluster being consolidated and treated as one. Also, requests to shared services, programs or servlets that result in an upload of other forms of data are billed in a similar manner as described for requests for files. Therefore, the present invention has been disclosed by way of illustration and not limitation, and reference should be made to the following claims to determine the scope of the present invention.

What is claimed:

1. A computer implemented method for determining an amount to bill a first owner of a first application executing in a computer, and a second owner of a second application executing in said computer, said computer implemented method comprising the steps of:

receiving, at said computer, a request made by a remote client computer to transfer a file to said remote client computer, wherein said file is shared by said first application and said second application;

determining, by a billing computer, whether said remote client computer made a prior request to said first application at a first time that is more recent to said request to transfer said file than a second time of a prior request made by said remote client computer to said second application;

responsive to determining that said remote client computer made a prior request to said first application at a first time that is more recent to said request to transfer said file than a second time of a prior request made by said remote client computer to said second application, the billing computer determining that transfer of said file to said remote client computer should be billed to said first owner; and the billing computer electronically billing said first owner for said transfer of said file to said remote client computer.

2. A computer implemented method as set forth in claim 1 further comprising the steps of:

determining, by the billing computer, a length of said file transferred to said remote client computer; and the billing computer electronically billing said first owner based on said length of said file transferred to said remote client computer.

3. A computer implemented method as set forth in claim 1 wherein said file comprises a web page.

4. A computer implemented method as set forth in claim 1 wherein said file comprises a first file, and wherein said prior request to said first application was for a second file different than said first file.

5. A computer system for determining an amount to bill a first owner of a first application executing in a computer, and a second owner of a second application executing in said computer, said system comprising:

a central processing unit, a computer readable storage medium and a computer readable memory;

first program instructions for receiving, at said computer, a request made by a remote client computer to transfer a file to said remote client computer, wherein said file is shared by said first application and said second application;

second program instructions for a billing computer to determine whether said remote client computer made a prior request to said first application at a first time that is more recent to said request to transfer said file than a second time of a prior request made by said remote client computer to said second application;

third program instructions, responsive to determining that said remote client computer made a prior request to said first application at a first time that is more recent to said request to transfer said file than a second time of a prior request made by said remote client computer to said second application, for the billing computer to determine that transfer of said file to said remote client computer should be billed to said first owner; and fourth program instructions for the billing computer to electronically bill said first owner for said transfer of said file to said remote client computer, wherein said first, second, third and fourth program instructions are stored on said computer readable storage medium for execution by said central processing unit via said computer readable memory.

6. A system as set forth in claim 5 further comprising:

fifth program instructions for the billing computer to determine a length of said file transferred to said remote client computer; and sixth program instructions for the billing computer to electronically bill said first owner based on said length of said file transferred to said remote client computer, wherein said fifth and sixth program instructions are stored on said computer readable storage medium for execution by said central processing unit via said computer readable memory.

7. A system as set forth in claim 5 wherein said file comprises a web page.

8. A system as set forth in claim 5 wherein said file comprises a first file, and wherein said prior request to said first application was for a second file different than said first file.

9. A computer program product, comprising:

a computer readable storage medium having program instructions for determining an amount to bill a first owner of a first application executing in a computer, and a second owner of a second application executing in said computer, said program instructions comprising:

first program instructions for receiving, at said computer, a request made by a remote client computer to transfer a file to said remote client computer, wherein said file is shared by said first application and said second application;

second program instructions for a billing computer to determine whether said remote client computer made a prior request to said first application at a first time that is more recent to said request to transfer said file than a second time of a prior request made by said remote client computer to said second application;

third program instructions, responsive to determining that said remote client computer made a prior request to said first application at a first time that is more recent to said request to transfer said file than a second time of a prior request made by said remote client computer to said second application, for the billing computer to determine that transfer of said file to said remote client computer should be billed to said first owner; and fourth program instructions for the billing computer to electronically bill said first owner for said transfer of said file to said remote client computer.

10. A computer program product as set forth in claim 9, further comprising:

fifth program instructions for the billing computer to determine a length of said file transferred to said remote client computer; and sixth program instructions for the billing computer to electronically bill said first owner based on said length of said file transferred to said remote client computer, wherein said fifth and sixth program instructions are stored on said computer readable storage medium.

11. A computer program product as set forth in claim 9 wherein said file comprises a web page.

12. A computer program product as set forth in claim 9 wherein said file comprises a first file, and wherein said prior request to said first application was for a second file different than said first file.

* * * * *